May 30, 1961  J. C. HOUDA, JR., ET AL  2,986,625
APPARATUS FOR PERCUSSIVELY WELDING LEADS
TO ELECTRICAL COMPONENTS
Filed April 11, 1960  6 Sheets-Sheet 1
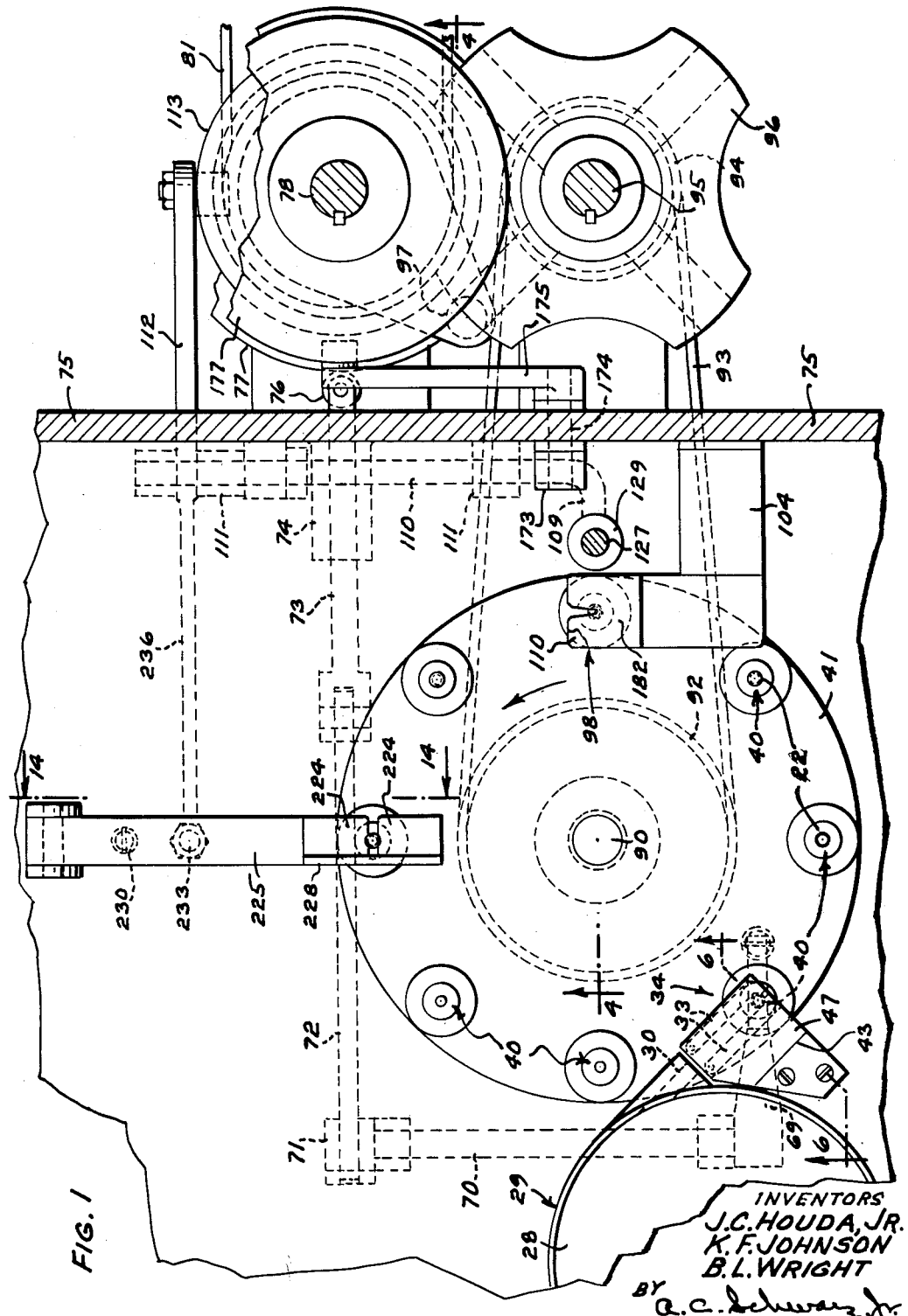
FIG. I
INVENTORS
J.C. HOUDA, JR.
K. F. JOHNSON
B. L. WRIGHT
BY
A.C. Schwarz Jr.
ATTORNEY

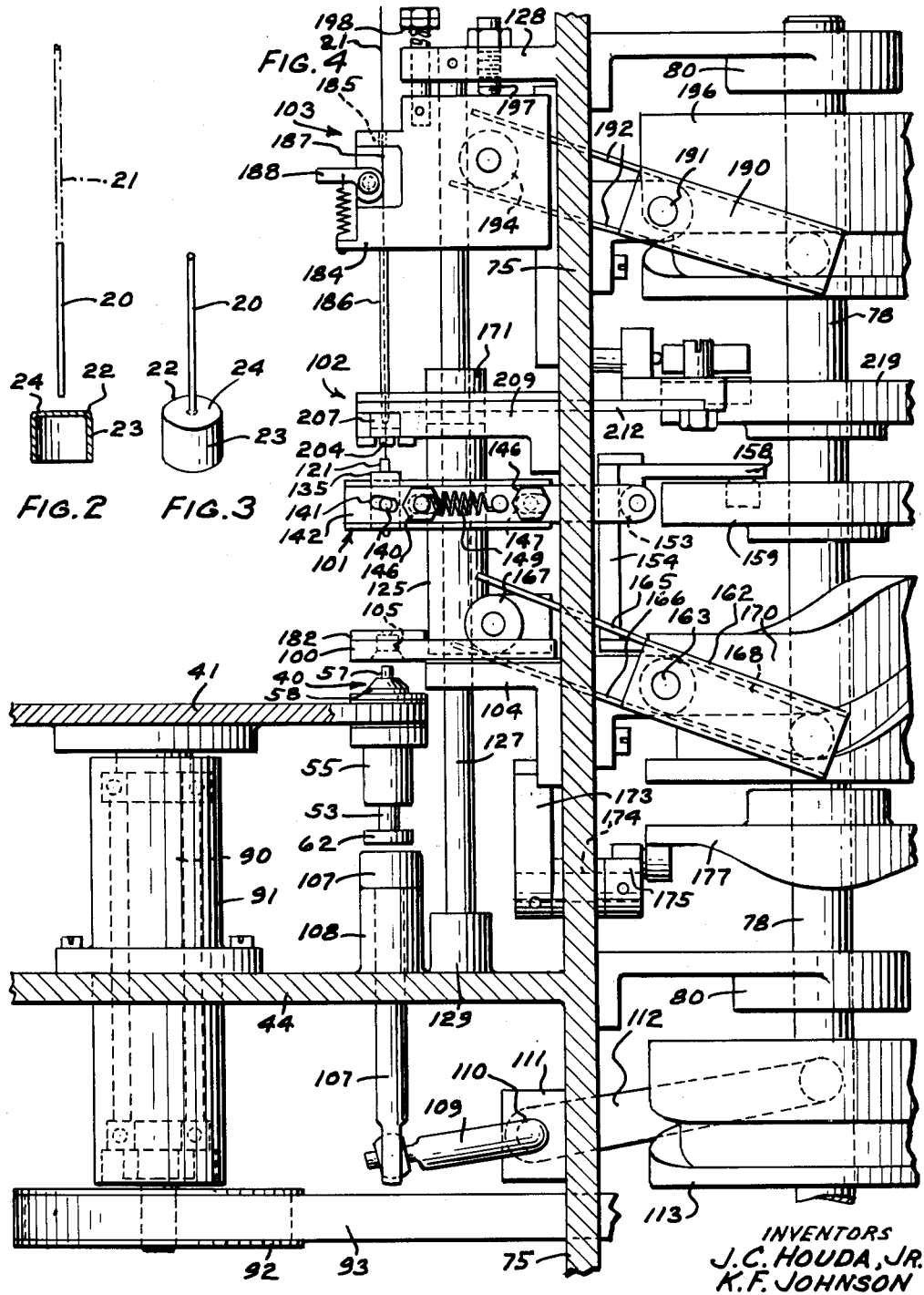

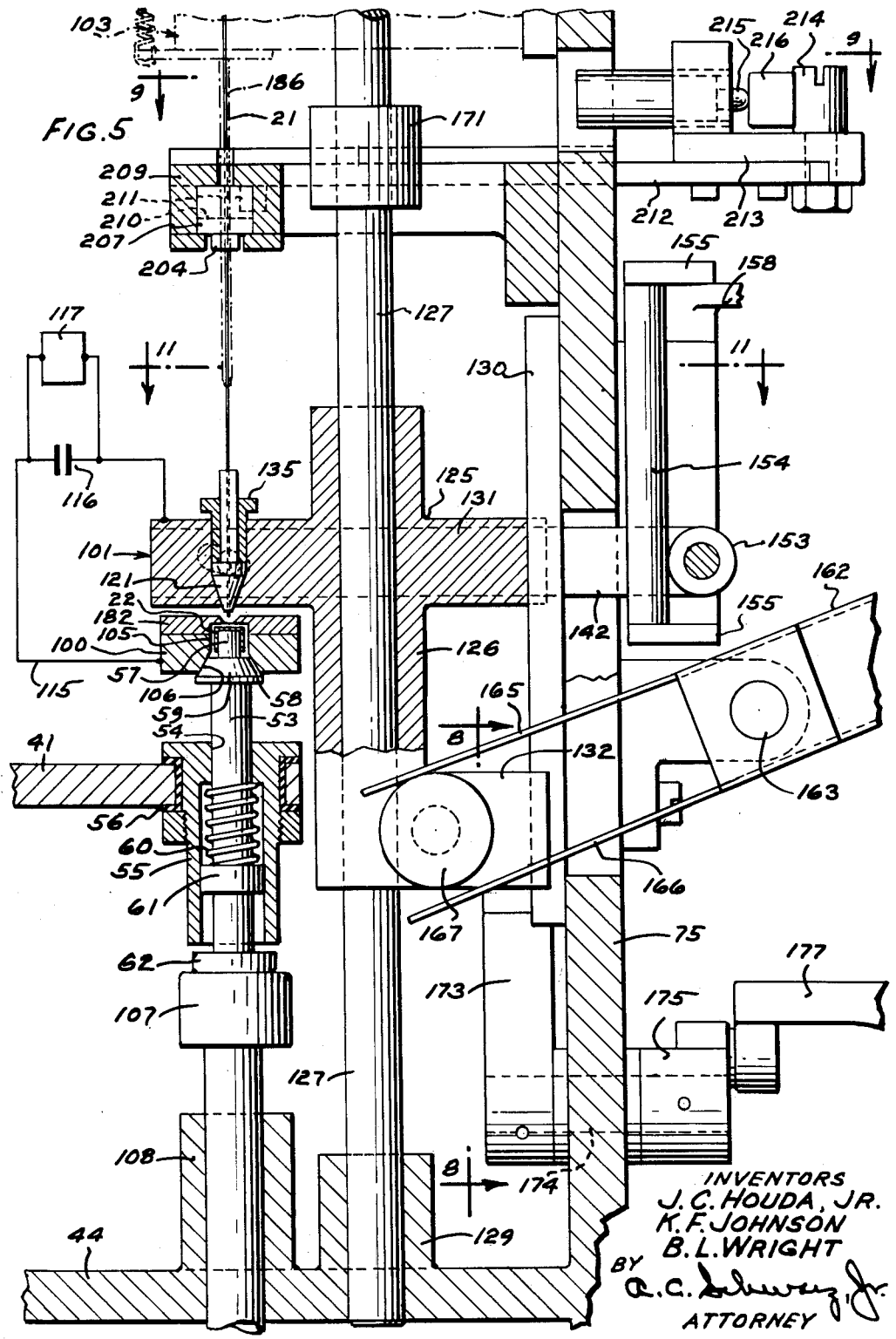

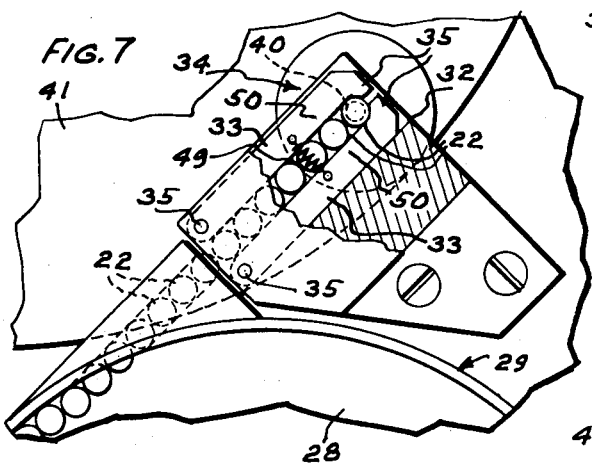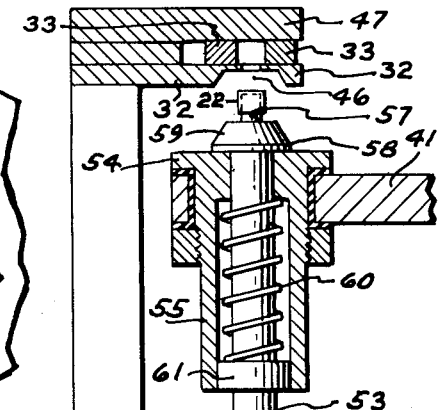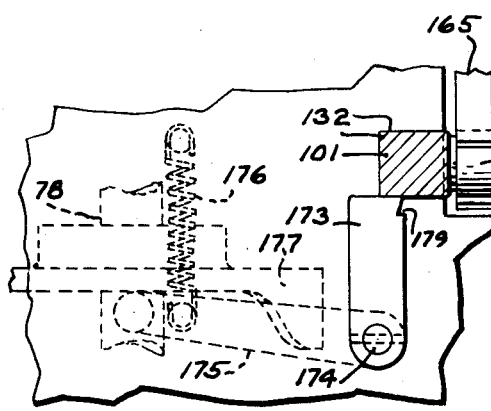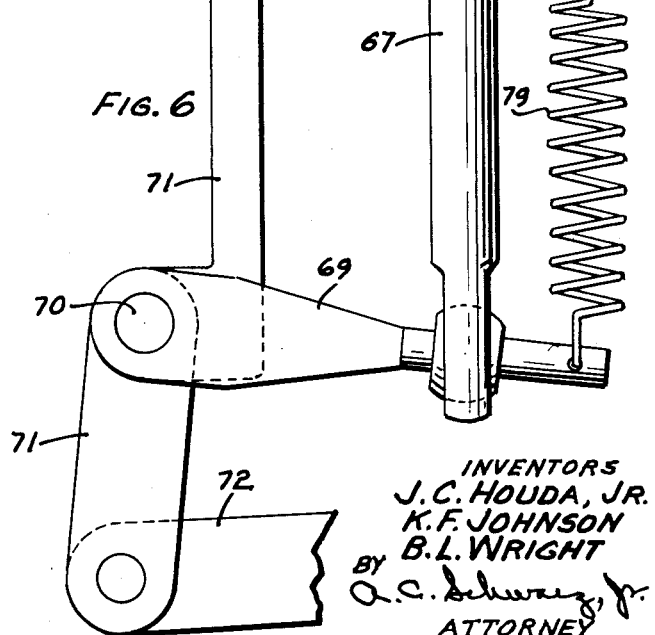

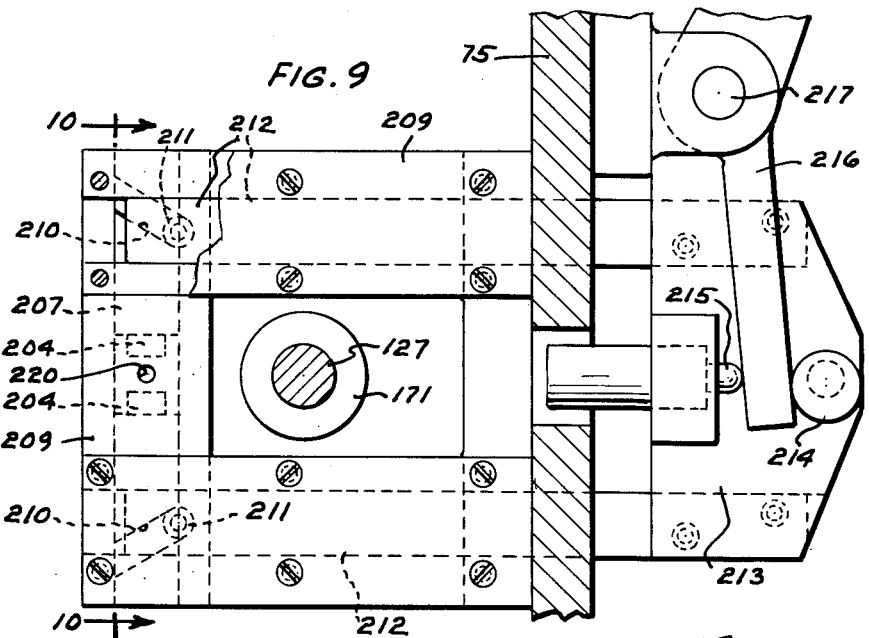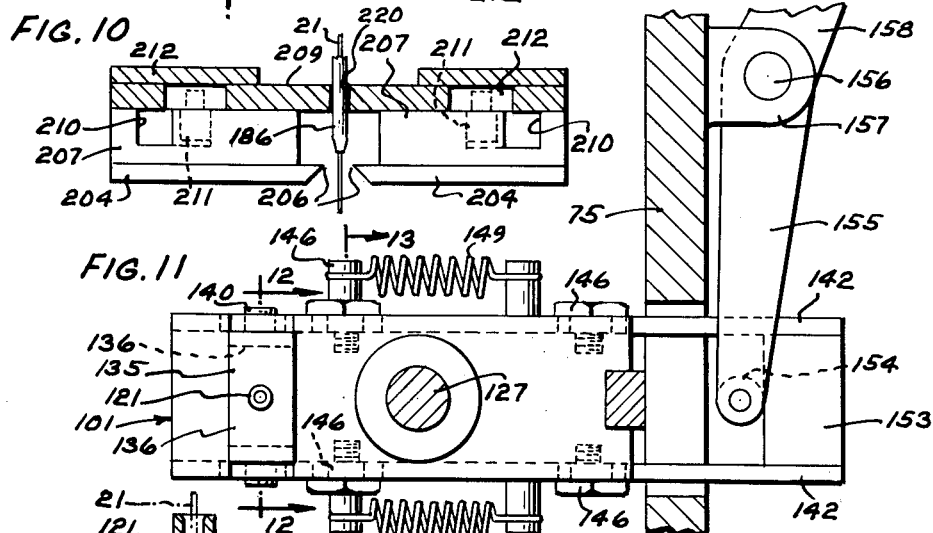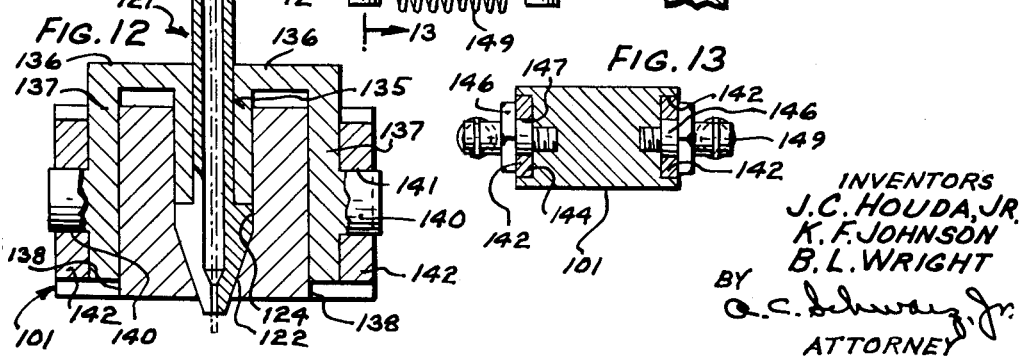

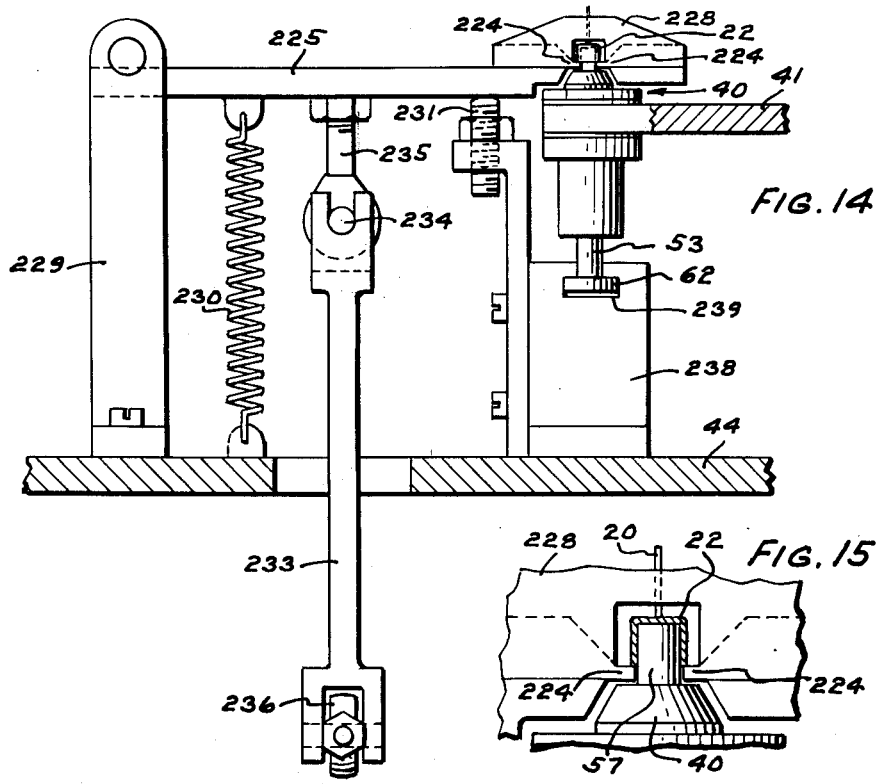
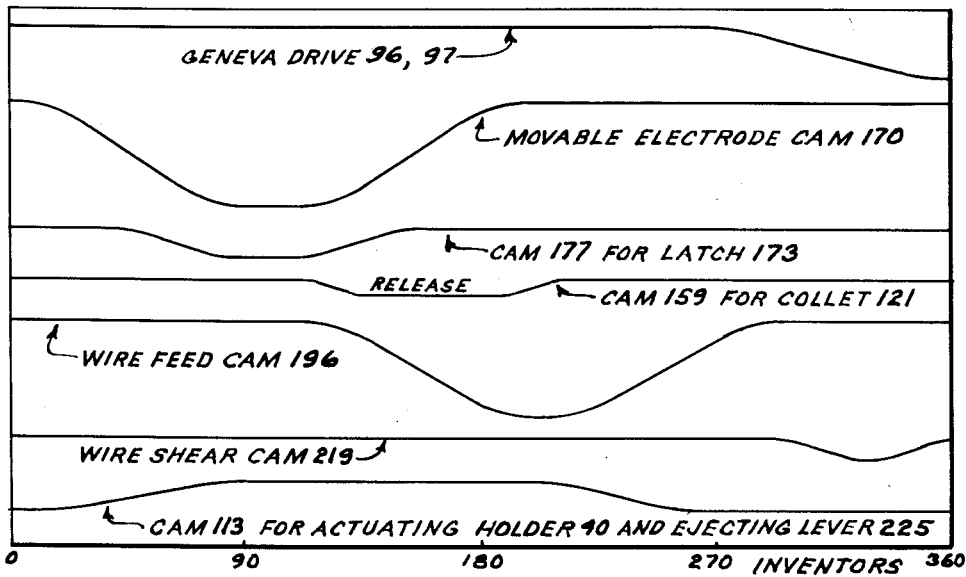

United States Patent Office 2,986,625
Patented May 30, 1961

2,986,625

APPARATUS FOR PERCUSSIVELY WELDING LEADS TO ELECTRICAL COMPONENTS

James C. Houda, Jr., Downers Grove, Kenneth F. Johnson, Oak Lawn, and Ben L. Wright, Chicago, Ill., assignors to Western Electric Company, Incorporated, New York, N.Y., a corporation of New York Filed Apr. 11, 1960, Ser. No. 21,355

10 Claims. (Cl. 219—95)

This invention relates to apparatus for percussively welding leads to electrical components, and more particularly to an apparatus for automatically orienting and feeding the electrical components and forming and welding leads thereto.

An object of the invention is to provide an apparatus for percussively welding leads to electrical components.

Another object of the invention is to provide an apparatus for automatically orienting and feeding electrical components and forming and welding leads thereto.

With these and other objects in view, the invention contemplates the provision of an indexible carrier having mounted thereon a plurality of vertically movable holders for supporting cup-shaped electrical components which are oriented and advanced to a delivery position at a loading station. A holder moved by the carrier into the loading station is raised in gripping engagement with the component and as the carrier is indexed the holder removes the component from the loading station and advances it to a predetermined position at a welding station below and in vertical alignment with a fixed electrode which is electrically connected to a welding circuit. The holder is then moved upwardly into engagement with the electrode to support the component in a welding position and to electrically connect the component to the welding circuit.

A movable electrode, electrically connected to the welding circuit and having a wire gripping collet, is mounted above the fixed electrode for vertical movement to and from a normal upper position in which the collet is actuated to open condition and a wire feeding mechanism is actuated to advance a wire from a supply thereof into the collet with the end of the wire projecting a short distance below the collet. The collet is then actuated to grip the wire and a wire cutting means is actuated to sever the wire to form a lead of predetermined length supported by the movable electrode which is then actuated to carry the lead downwardly into percussive engagement with the component and to effect the percussive welding of the lead to the component. The collet is then actuated to release the lead and the movable electrode is raised to its upper position above the lead after which the holder is advanced to an ejecting station where the welded component and lead assembly is removed from the holder.

Other objects, advantages and novel aspects of the invention will become apparent upon consideration of the following detailed description, in conjunction with the accompanying drawings, in which:

Fig. 1 is a fragmentary plan view of the welding apparatus embodying the present invention;

Fig. 2 is a sectional elevational view of a lead and an electrical component to which the lead is to be welded in the present apparatus;

Fig. 3 is a perspective view of the electrical component with the lead welded thereto;

Fig. 4 is a fragmentary vertical sectional view of the apparatus taken on line 4—4 of Fig. 1;

Fig. 5 is an enlarged vertical sectional view of a portion of the mechanism shown in Fig. 4 with parts thereof shown in different positions;

Fig. 6 is a fragmentary vertical sectional view through the loading station of the apparatus taken on line 6—6 of Fig. 1;

Fig. 7 is an enlarged fragmentary plan view of the loading station;

Fig. 8 is a fragmentary vertical sectional view of the apparatus taken on line 8—8 of Fig. 5;

Fig. 9 is an enlarged fragmentary horizontal sectional view of the apparatus taken on the line 9—9 of Fig. 5 and showing the wire cutting mechanism;

Fig. 10 is a vertical cross-sectional view taken on the line 10—10 of Fig. 9 and showing the wire cutters;

Fig. 11 is a fragmentary horizontal sectional view taken on the line 11—11 of Fig. 5 showing the movable electrode;

Fig. 12 is an enlarged vertical cross-sectional view taken on the line 12—12 of Fig. 11 showing the wire gripping collet on the movable electrode;

Fig. 13 is a cross-sectional view through the movable electrode taken on the line 13—13 of Fig. 11;

Fig. 14 is a fragmentary vertical sectional view taken on the line 14—14 of Fig. 1 showing a mechanism for stripping the components from the holders;

Fig. 15 is an enlarged fragmentary view of the stripper member shown in Fig. 14; and Fig. 16 is a cam and timing chart of the apparatus.

The present apparatus is designed to form leads 20 from a supply of wire 21 and weld them onto electrical components in the form of metallic cup-shaped caps 22 (Figs. 2 and 3) which are to be applied to the ends of carbon deposited resistors and the like. Each cap 22 is open at one end and has a cylindrical wall 23 and an end wall 24.

A supply of the caps 22 is placed into a hopper 28 of a device 29 (Fig. 1) for vibrating the hopper to orient the caps with the open ends directed downwardly and to feed the caps in a row along a guideway 30 onto a stationary supporting plate 32 between a pair of arms 33 at a loading station 34. The arms 33 are mounted on the plate 32 for pivotal movement about pins 35 and have inwardly directed projections 36 on the free ends thereof for stopping the row of caps in a delivery position and locating the endmost cap above and in vertical alignment with a cap holder 40 mounted on a feed table 41.

A post 43 fixed to a horizonatl frame plate 44 of the apparatus fixedly supports the plate 32 which is provided with a clearance opening 46 for the movement of the upper portion of the holder 40 into engagement with a cap 22. An abutment plate 47 is mounted on the plate 32 in overlying relation to the pivoted arms 33 and the cap 22 to prevent upward displacement of the cap. A spring 49 (Fig. 7) yieldably retains the arms in normal positions against stop pins 50 on the member 47.

A plurality of the holders 40 is mounted on the feed table 41 for movement therewith and for vertical movement relative thereto, and each holder comprises a rod 53 (Figs. 5 and 6) slidable in a bore 54 in a tubular guide member 55 which is mounted on the feed table 41 and insulated therefrom by a dielectric bushing 56. The upper end of the rod 53 forms an anvil 57 adapted to fit within the cap 22 in tight engagement with the side and end walls thereof to frictionally retain the cap thereon and establish an electrical connection therewith. An enlarged shoulder portion 58 having tapered surfaces 59 is formed on the rod 53 adjacent the anvil 57 for engaging the cylindrical guide member 55 and limiting the downward movement of the rod which is imparted to the rod by a spring 60 acting against a collar 61 on the rod 53 and a shoulder formed by the counterbored portion of the bore 54 in the tubular guide 55. At its lower end the rod 53 is provided with an enlarged head 62.

At the loading station 34 the holder 40 is positioned above a push rod 67 (Fig. 6) which is slidable in a guide 68 on the horizontal frame plate 44 and is pivotally connected to a lever 69 fixed to a shaft 70. The shaft 70 is supported in brackets 71 on the horizontal frame plate 44 and has a lever 71 fixed thereto at its other end, which lever is connected through a link 72 to a push rod 73 (Fig. 1) slidable in a guide 74 that is mounted on a vertical frame plate 75 to which the horizontal frame plate 44 is also secured. A roller 76 on the other end of the push rod 73 engages a cam 77 on a cam shaft 78 for effecting the reciprocation of the push rod 67 in cooperation with a spring 79 interconnected between the lever 69 and the frame plate 44 (Fig. 6) to raise the rod 53 and force the upper end 57 thereof into a cap 22 supported in its path on the plate 32. The cam shaft 78 is rotatably supported in bearing brackets 80 fixed to the vertical frame plate 75 and is driven through a belt and pulley connection 81 by a motor (not shown).

A pair of wedge-shaped retaining members 82 are fixed to the upper ends of a pair of flat springs 83 mounted on their lower ends on the guide 68 and the members 82 have sloping surfaces engageable with the head 62 of the rod 53 to yieldably maintain the rod and the cap holder 40 in an upper position in engagement with the cap 22 and against the force of the spring 60 until the cap 22 has been withdrawn horizontally from between the ends of the arms 33 during the next indexing movement of the feed table 41. After the cap 22 and the anvil 57 of the holder 40 have been moved from the arms 33 and the head 62 of the holder becomes disengaged from the retaining members 82, the holder 40 is returned to its normal lower position by the spring 60.

The feed table 41 is mounted on the upper end of a shaft 90 (Fig. 4) which is rotatably supported in a bearing member 91 and has a toothed pulley 92 secured to the lower end thereof. The pulley 92 is driven by a cog type timing belt 93 from a driving pulley 94 which is fixed to a shaft 95 mounted in parallel relation to the cam shaft 78 in suitable bearing brackets (Fig. 1) on the vertical frame plate 75. The shaft 95 is intermittently rotated through a Geneva movement, the Geneva wheel 96 thereof being secured to the shaft 95 and the driving lever 97 being secured to the cam shaft 78. Thus for every revolution of the cam shaft 78, the shaft 95 is rotated through one quarter of a turn and serves to index the feed table 41 step by step and advance the holders 40 successively through the loading station 34, a welding station 98, and an ejecting station 99.

At the welding station 98, the holder 40 is positioned below and in vertical alignment with a fixed electrode 100, a movable electrode 101 for holding the lead 20 (Figs. 4 and 5), a wire cutting mechanism 102, and a wire feed mechanism 103. The fixed electrode 100 is supported on a bracket 104 on the vertical frame plate 75 in electrically insulated relation thereto and is provided with a slot 105 providing clearance for the reception of a cap 22 and the upper portion of the holder 40. The fixed electrode 100 is also provided with a conical surface 106 conforming to and engageable with the tapered surface 59 of the cap holder 40 when the holder is moved upwardly into engagement therewith.

Upward movement is imparted to the holder 40 by a plunger 107 mounted for vertical movement in a guide 108 on the horizontal frame plate 44 and reciprocated by a crank arm 109 fixed to a shaft 110 which is suitably mounted in bearing blocks 111 on the vertical frame plate 75. A cam lever 112 fixed to the shaft 110 is actuated by a cam 113 on the cam shaft 78 for effecting the reciprocation of the plunger 107 and the movement of the holder 40 into and out of engagement with the fixed electrode 100 at the welding station 98 in a predetermined timed relation to the indexing of the feed table 41.

As indicated diagrammatically in Fig. 5, the fixed electrode 100 and the movable electrode 101 are connected to a welding circuit 115 having a capacitor 116 chargeable to a predetermined voltage by means 117 forming a portion of the welding circuit.

The movable electrode 101 (Figs. 5, 11 and 12) supports a collet 121 which is provided with a central bore for receiving the wire 21 therethrough and is also provided with an enlarged longitudinall slotted head 122 with a conical outer surface forming a plurality of spring fingers. The collet 121 is mounted for reciprocation in a vertical aperture 124 formed in the movable electrode 101 and having a conical lower surface engaging the head of the collet. The movable electrode 101 which is in the form of a cross-shaped block 125 having an apertured vertical portion 126 is slidably mounted for vertical movement on a guide rod 127 which is secured in an upper bracket 128 on the vertical frame plate 75 and an apertured boss 129 on the horizontal frame plate 44 (Fig. 4). A guide rid 130 on the vertical frame plate 75 engages in grooves in horizontally disposed portions 131 and 132 of the block 125 to prevent turning movement thereof on the guide rod 127.

The spring fingers of the collet 121 have a normal open position permitting free movement of the wire 21 therethrough, and in order to effect a gripping engagement with the wire, the collet is adapted to be moved downwardly by the central sleeve portion 134 of a collet actuating member 135 (Fig. 12) movable over the shank of the collet and engaging the head 122 thereof. Laterally extending portions 136 of the actuating member 135 have a pair of downwardly directed arms 137 thereon slidable in vertical grooves 138 in the electrode 101, and the arms 137 have outwardly directed trunnions 140 which fit in obliquely disposed slots 141 formed in a pair of bars 142. These bars 142 are slidably mounted in horizontal guideways 144 (Fig. 12) formed on the horizontal portion 131 of the movable electrode 101 and are retained therein by headed studs 146 secured to the electrode and passing through slots 147 in the bars.

Springs 149 secured at one end to the bars 142 and at their other ends to a pair of the studs 146 stress the bars 142 to the left as viewed in Fig. 4 to actuate the collet 121 to closed position to grip the wire 21. A horizontally disposed roller 153 connected to and between the right hand ends of the bars 142 (Figs. 4, 5 and 11) engages a vertically disposed roller 154 mounted between the ends of a pair of levers 155 which are fixed at their other ends to a rod 156 oscillatably supported in a bracket 157 on the vertical frame plate 75. A lever 158 fixed to the rod 156 cooperates with a cam 159 on the cam shaft 78 to move the collet actuating bars 142 to the right to cause the collet 121 to release the wire 21.

The movable electrode 101 is vertically reciprocated through a predetermined stroke by a lever 162 pivotally supported on a rod 163 supported in suitable brackets on the vertical frame plate 75, the lever 162 having a pair of flat springs 165 and 166 engageable with the upper and lower sides of a roller 167 on the electrode 101. A cam lever 168 fixed to the rod 163 is actuated by a cam 170 which is fixed to the cam shaft 78 and serves to effect the reciprocation of the movable electrode 101. A collar 171 on the guide rod 127 limits the upward movement of the movable electrode 101 to locate it in a predetermined relation to the wire cutting mechanism 102.

A latch 173 fixed to a pivot pin 174 supported in the vertical frame plate 75 serves to stop the electrode 101 prior to the completion of its downward movement and locate it and the projecting end of the lead 21 therein in a predetermined position (Fig. 5) in spaced relation and in close proximity to the cap 20 on the holder 40. As the cam 170 imparts additional movement to the lever 168, the flat spring 165 is flexed to increase the force tending to move the electrode 101 downwardly. A cam lever 175 (Figs. 4, 5 and 8) fixed to the pivot pin 174 and extending laterally therefrom is stressed for movement upwardly by a spring 176 and is actuated by a cam 177 fixed to the main drive shaft 78 for effecting the disengagement of the latch 173 from the movable electrode 101 to permit the leaf spring 165 to move the electrode 101 rapidly downwardly to effect the percussive welding of the lead 21 to the cap 22. It will be understood that as the end of the lead 20 approaches the cap 22, the capacitor 116 in the welding circuit 115 will discharge thereby creating an arc between, and melting the adjacent surfaces of, the cap and lead prior to their engagement with each other. The spring 165 serves to maintain the lead 20 in engagement with the cap 22 during the cooling of the weld and prevents rebound of the movable electrode 101. A shoulder 179 (Fig. 8) is provided on the latch 173 to engage and stop the movable electrode 101 to prevent the collet 121 from striking the cap 22 or the anvil 57 in the event that no wire is in the collet.

After the lead 20 has been welded to the cap 22, the cam 113 effects the retraction of the plunger 107 and the spring 60 moves the holder 40 and the cap and lead assembly thereon downwardly to disengage the holder 40 from the fixed electrode 100 and return it to its normal position on the feed table 41. Substantially simultaneously therewith the cam 159 serves to open the collet 121 to release the lead 20 and permit its withdrawal from the collet 121 as the holder 40 moves downwardly and the movable electrode 101 is returned by the cam 170 to its upper position above the end of the lead 20. A slotted stripper plate 182 of dielectric material is secured to the upper surface of the fixed electrode 100 as a safety measure to prevent the possibility of the cap 22 and the lead 20 being carried upwardly with the movable electrode due to frictional engagement between the lead 20 and the electrode 101. As the electrode 101 returns to its upper position the wire feed mechanism 103 moves downwardly to feed the end of the wire 21 into the collet 121.

The wire feed mechanism 103 (Fig. 4) comprises a block 184 that is slidably mounted on the guide rod 127 and the guide rib 130 and has a guideway 185 therein and a guide tube 186 extending downwardly therefrom for guiding the wire 21 vertically therethrough into the collet 121. The wire is adapted to be gripped against a fixed jaw 187 on the block 184 by a movable gripping jaw 188 which is spring actuated and operates to grip and feed the wire during the downward movement of the block 184 and to release the wire and permit movement of the block relative to the block 184.

Reciprocatory movement is imparted to the block 184 by a lever 190 pivotally supported at 191 on the vertical frame plate 75 and having a pair of flexible flat springs 192 engaging opposite sides of a roller 194 on the block 184. The lever 190 is actuated by a cam 196 on the cam shaft 78 for reciprocating the block 184 through a stroke determined by a stop screw 197 on the bracket 128 and a stop 198 fixed to the block 184 and engageable with the bracket 128.

The wire 21 with the end portion thereof extending from the guide tube 186 is moved downwardly with the guide tube by the wire feed mechanism 103 through the wire cutting mechanism 102 into the collet 121 and is stopped in a position with the end of the wire projecting a predetermined distance beyond the lower end of the collet after which the collet is actuated by the springs 149 under control of the cam 159 to grip the wire. The wire feed mechanism 103 is then returned upward to its normal upper position while the wire 21 is held stationary by the collet 121 after which the wire cutting mechanism 102 is actuated to sever a predetermined length of the wire to form the lead 20 held by the collet 121.

The wire cutting mechanism 102 (Figs. 4, 5, 9 and 10) comprises a pair of wire cutting blades 204 having opposed cutting edges 206 adapted to engage opposite sides of the wire 21 to sever it. The cutting blades 204 are fastened to slide blocks 207 slidably mounted in a guideway in a guide member 209 secured to the vertical frame plate 75. The slide blocks 207 are provided with obliquely disposed cam slots 210 for receiving cam followers 211 extending downwardly from a pair of slide bars 212 also slidable in suitable guideways in the guide member 209. The two slide bars 212 are connected together at one end by a plate 213 that has a pin 214 and a spring plunger 215 therein engaging opposite sides of one end of a cam lever 216. This lever is pivotally supported at 217 by a bracket on the vertical frame plate 75, and is actuated by a cam 219 (Fig. 4) which is fixed to the cam shaft 78 for effecting reciprocation of the slide bars 212 in one direction and the reciprocation of the slide blocks 207 and the cutting blades 204 in a transverse direction to sever the wire 21. An opening 220 in the guide member 209 provides clearance for movement of the wire 21 and the guide tube 186 of the wire feed mechanism 103.

After the lead 20 has been welded onto the cap 22 at the welding station 98, the cap and lead assembly and the holder 40 supporting it are advanced by the feed table 41, on the second following cycle, into the ejecting station 99 into engagement with a pair of horizontally spaced apart stripping jaws 224 (Figs. 1, 14 and 15) on an oscillatory ejecting arm 225, the anvil 57 of the holder being positioned between the jaws 224 and the cap 22 being positioned above the jaws 224. The jaws 224 are supported in a predetermined spaced and fixed relation to each other by a bridge 228 and are adapted to strip the cap and lead assembly from the holder 40 and cause it to be ejected upwardly and to one side of the apparatus as the ejecting arm is actuated.

The ejecting arm 225 is pivotally supported at one end thereof by a bracket 229 on the horizontal frame plate 44 and is urged downwardly by a spring 230 to a normal position of rest in engagement with a stop 231. A pusher rod 233 for raising the ejector arm 225 is pivotally connected at its upper end through a pin and slot connection 234 to a downwardly extending member 235 on the arm 225 and at its lower end, the pusher rod 233 is connected to one end of a lever 236. This lever is connected at its other end to the rock shaft 110 and is formed as a part of the lever 112 (Fig. 1). Thus as the cam 113 oscillates the shaft 110 to impart reciprocatory movement to the plunger 107 at the welding station 98, it also serves to move the ejector arm 225 rapidly upwardly at the ejecting station 99 to strip the cap and the lead assembly from the holder 40 and eject it laterally from the apparatus. A block 238 having a T-shaped slot 239 for receiving the head 62 of the cap holder 40 is fixed to the horizontal frame plate 44 at the ejecting station 99 to retain the rod 53 against upward movement during the stripping of the cap 20 therefrom.

*Operation*

With a supply of caps 22 in the device 29 for orienting and feeding the caps to a delivery position at the transfer station 34 and with a supply of wire 21 at the lead forming and welding station 98 and with the apparatus operating, the feed table 41 is intermittently actuated to advance the holders 40 into the loading station 34, the welding station 98, and the ejecting station 99, and to maintain them in said stations for predetermined intervals of time. At the loading station 34, the holder 40 is raised by the push rod 67 to press the anvil 57 of the holder into engagement with a cap 22 supported in its path on the plate 32 between the positioning arms 33, and the holder is yieldably held in its elevated position in engagement with the cap by the spring mounted retaining members 82. As the feed table 41 is again indexed, the holder 40 in its raised position is moved therewith and withdraws the cap 22 horizontally from between the positioning arms 33, and as the head 62 of the holder 40 disengages the retaining members 82, the holder 40 is returned to its normal lower position on the feed table by the spring 60.

After the holder 40 with the cap 22 thereon has been advanced into the welding station 98, it is raised to the welding position with the shoulder 58 on the holder 40 pressed tightly against the fixed electrode 100, thereby electrically connecting the cap 22 on the holder to the welding circuit and locating the cap in the path of movement of the movable electrode 101 and the lead 20 therein. Simultaneous with the upward movement of the holder 40 the movable electrode 101 is moved downwardly by the flexible lever 162 and is stopped by the latch 173 in the position shown in Fig. 5 with the end of the lead 20 disposed in spaced and close proximity to the cap 22 after which the lever 162 continues its movement to flex the spring 165 and apply additional downward pressure to the movable electrode 101. The latch 173 is then withdrawn and the loaded spring 165 causes the movable electrode 101 to travel rapidly downwardly and to carry the lead 20 into percussive engagement with the cap 22 to effect the percussive welding of the lead 20 thereto.

The collet 121 is actuated to release the lead 20 and the movable electrode 101 is moved upwardly to its normal upper position (Fig. 4) and simultaneously therewith the wire feed mechanism 103 moves downwardly a predetermined distance to feed the end of the wire 21 into the collet 121 of the movable electrode to locate the wire with the end thereof projecting a predetermined distance below the collet. The collet 121 is then actuated to grip the wire 21 after which the wire feed mechanism 103 is retracted to its normal upper position while the wire 21 is held stationary by the collet 121. The wire cutting mechanism 102 is then actuated to sever the wire 21 at a predetermined distance from the end thereof to form a lead 20 of a predetermined length releasably held in the movable electrode 101 in condition for welding onto a cap 22 during the following cycle of operation.

After the holder 40 with the welded cap and lead assembly thereon has been advanced by the feed table 41 into the ejecting station 99 with the cap 22 positioned above the stripping jaws 224, the ejecting lever 225 is rapidly thrust upwardly to strip the cap and lead assembly from the anvil 57 of the holder and eject it upwardly and laterally from the apparatus into a receptacle provided therefor.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for welding a conductor to an electrical component comprising a fixed electrode connected to a welding circuit, a holder for supporting the component, means for moving said holder into engagement with said electrode to support the component in a welding position and to electrically connect it to the welding circuit, a second electrode connected to the welding circuit for gripping the conductor and electrically connecting it to the welding circuit, and means for moving said second electrode toward said fixed electrode to carry the conductor into percussive engagement with the component and effect the percussive welding of the conductor thereto.

2. An apparatus for welding a lead to an electrical component comprising a holder for supporting the component, mounting means for supporting the holder for movement along a predetermined path, a first electrode fixedly supported on said mounting means in the path of movement of said holder and connected to a welding circuit, means for moving said first holder into engagement with said electrode to support the component in a welding position and to electrically connect it to the welding circuit, a second electrode movably supported on said mounting means and connected to the welding circuit for gripping said lead and electrically connecting it to said welding circuit, and resilient means for moving said second electrode toward said fixed electrode to carry the conductor into percussive engagement with the component to effect the percussive welding of the conductor thereto and to hold the lead against the component during the cooling of the weld.

3. In an apparatus for welding leads onto articles, a holder for supporting the article thereon, mounting means for supporting the holder at a welding station for movement along a predetermined axis, a first electrode connected to a welding circuit and fixedly supported on said mounting means in the path of movement of said holder, means at said welding station for moving said holder into engagement with said electrode to electrically connect the article to the welding circuit and to support the article in a welding position, a second electrode supported on said mounting means for movement along said axis for gripping one end of a wire from a supply thereof with a portion of the wire extending in advance of the second electrode, a wire feeding device supported on said mounting means and operable in timed relation to said holder moving means for feeding the wire into said second electrode, means operable in timed relation to said wire feeding means for severing the wire to form a lead in said second electrode, and means operable in timed relation to said wire feeding means for moving said second electrode toward said fixed electrode to effect the percussive welding of the lead to said article.

4. In an apparatus for welding leads onto articles, a holder for supporting the article thereon, mounting means for supporting the holder at a welding station for movement along a predetermined axis, a first electrode connected to a welding circuit and fixedly supported on said mounting means in the path of movement of said holder, means at said welding station for moving said holder into engagement with said electrode to support the article in a welding position and to electrically connect the article to the welding circuit, a second electrode supported on said mounting means for movement along said axis toward and away from said first electrode, means on said second electrode for gripping and releasing one end of a wire from a supply thereof, a wire feeding device supported on said mounting means for advancing the wire intermittently to feed one end of the wire into said gripping means on said second electrode, means for actuating said wire gripping means to grip and release the wire, means for severing the wire to form a lead in said second electrode, and means for moving said second electrode toward said fixed electrode to effect the percussive welding of the lead to the article.

5. In an apparatus for welding leads onto cup-shaped articles, a rod-shaped holder having an upper end portion adapted to be pressed into the article for supporting it, a carrier for supporting the holder in insulated relation thereto for movement therewith to a welding station and for vertical movement relative thereto, a fixed electrode supported at said welding station above and in the path of vertical movement of said holder and connected to a welding circuit, said holder having a shoulder engageable in a raised position with said fixed electrode and for limiting the downward movement of the holder to a lower position, resilient means for urging said holder to said lower position, means at the welding station for raising said holder to press the shoulder thereof into engagement with the stationary electrode to support the article in a welding position and to electrically connect the article to the welding circuit, a second electrode connected to said welding circuit for holding a lead with an end portion thereof projecting downwardly below said second electrode, and means for actuating said second electrode to effect the percussive engagement and welding of the lead to the article.

6. In an apparatus for welding leads onto cup-shaped articles, a plurality of holders each having a portion adapted to be pressed into the article for supporting it, a movable carrier for supporting the holders for movement therewith in a first direction to a welding station and for movement relative thereto in a second direction transversely of said first direction, a first electrode fixedly supported at said welding station in the path of movement of a holder at said welding station and electrically connected to a welding circuit, means at said welding station for moving the holder into engagement with said fixed electrode to electrically connect the article to the welding circuit and to support the article in a welding position, a second electrode electrically connected to the welding circuit movably supported at the welding station for gripping a lead with the end thereof projecting in advance of the second electrode, resilient means for moving said second electrode through a predetermined stroke toward said fixed electrode, latching means for stopping the second electrode prior to the completion of said stroke in a predetermined position with the end of the lead in spaced and close relation to the article on said holder to load said resilient means for imparting rapid movement to said second electrode, and means for disengaging the latching means from the second electrode to render said resilient means operable to impart said rapid movement to said second electrode to advance the lead into percussive engagement with the article for effecting the percussive welding of the lead to the article and for yieldably maintaining the lead in engagement with the article during the cooling of the weld.

7. In an apparatus for welding leads onto articles, a holder for supporting an article thereon, mounting means for supporting the holder at a welding station for movement along a predetermined path, a first electrode connected to a welding circuit and fixedly supported on said mounting means in the path of movement of said holder, means at said welding station for moving said holder into engagement with said first electrode to electrically connect the article to the welding circuit and to support the article in a welding position, a second electrode supported on said mounting means for movement toward said first electrode for supporting a lead for movement therewith, a flexible lever operatively connected to said second electrode, means for actuating said flexible lever through a predetermined distance to move said second electrode through a predetermined stroke for advancing the lead into engagement with the article, means for stopping the second electrode prior to the completion of said stroke in a predetermined position with the lead in close proximity to the article on said holder and to effect the flexing and conditioning of said lever to urge said second electrode toward said first electrode, and means for disengaging the stop means from said second electrode to render said flexible lever operable to effect the percussive engagement and welding of the lead to the article.

8. In an apparatus for processing cup-shaped articles, a holder having an end portion frictionally engageable in the article for supporting the article thereon, a carrier for supporting the holder for movement therewith in a first direction to and from a loading station and for movement relative thereto in a second direction transversely of the first direction, means for supporting an article in a predetermined position in the loading station in the path of movement of said holder in the second direction and for releasing the article in response to movement thereof with said holder parallel to the first direction, and means at said loading station for moving said holder into engagement with the article.

9. In an apparatus for working cup-shaped articles, a carrier, a plurality of members movably mounted on said carrier for movement therewith in a first direction along a predetermined path to and from a loading station and movable relative to the carrier in a second direction transversely of the first path and having end portions adapted to be pressed into the cup-shaped articles for supporting the articles thereon, resilient means for moving the holders to a normal retracted position on said carrier, means for indexing the carrier to move successive holders to said loading station, means at said loading station for feeding and supporting the cup-shaped articles in a predetermined position in the path of movement of said holder at the loading station and for releasing said article in response to movement thereof substantially parallel to the first direction, means at said loading station for moving said holder in the second direction to an advanced position to press the end of the member into the article, and means for yieldably supporting said holder in the advanced position in engagement with the article until said holder with the article thereon is moved from the loading station.

10. In an apparatus for welding leads onto cup-shaped articles, a plurality of holders having upper extremities frictionally engageable in said cup-shaped articles for supporting the articles thereon, a carrier for supporting said holders for horizontal movement therewith and for vertical movement relative thereto, means for intermittently moving said carrier to advanced successive holders to and from a loading station, means forming a stationary guideway at said loading station for guiding a row of the articles therethrough substantially parallel to said first direction, means for feeding a row of the articles to said guide means with the open end of the articles directed downwardly, a pair of arms pivotally mounted on said guide means on opposite sides of said guideway and having laterally disposed portions thereof for stopping and positioning the endmost article in said row in the path of vertical movement of said holder, resilient means for urging said arms to an operative position for engaging the endmost article and for releasing the article in response to horizontal movement thereof with the holder, means at the loading station for raising the holder to a predetermined elevated position to press the end of the holder into the article, resilient means at said loading station engageable with the lower extremity of said holder for yieldably supporting said holder at the elevated position in engagement with the article until the article is removed horizontally from said guide means, and resilient means individual to said holders for retracting said holders to a normal position on said carrier.

References Cited in the file of this patent

UNITED STATES PATENTS 2,339,884 Schlumpf _____ Jan. 25, 1944